United States Patent [19]

Gyongyosi et al.

[11] Patent Number: 4,736,265
[45] Date of Patent: Apr. 5, 1988

[54] SAFETY DEVICE FOR A DIFFERENTIAL PROTECTION APPARATUS

[75] Inventors: Andras Gyongyosi, Angouleme; Bernard Dumortier, Mareil-Marly; Edmond Bielicki, Ermont, all of France

[73] Assignee: La Telemecanique Electrique, France

[21] Appl. No.: 87,955

[22] Filed: Aug. 14, 1987

Related U.S. Application Data

[63] Continuation of Ser. No. 792,709, Oct. 30, 1985, abandoned.

[30] Foreign Application Priority Data

Oct. 30, 1984 [FR] France ................... 84 16546

[51] Int. Cl.⁴ .................................. H02H 3/26
[52] U.S. Cl. ............................. 361/45; 361/46
[58] Field of Search .......... 361/42, 55, 44–50, 361/56, 54, 58, 88, 92, 100; 340/652, 662, 663; 363/50

[56] References Cited

U.S. PATENT DOCUMENTS 3,895,264  7/1975  Kirilloff ....................... 361/48
4,598,331  7/1986  Legatti ...................... 361/45 X Primary Examiner—A. D. Pellinen
Assistant Examiner—Todd E. DeBoer
Attorney, Agent, or Firm—William A. Drucker

[57] ABSTRACT

The invention provides a safety device for an electric installation protection apparatus, comprising a residual differential current detector through which pass a phase conductor and a neutral conductor, and a processing circuit supplied by a rectifier bridge and connected to the phase and neutral conductors. It further comprises biasing and safety circuits formed by a static bidirectional switch connected between a ground connection and the AC terminals of the rectifier bridge.

5 Claims, 2 Drawing Sheets

SAFETY DEVICE FOR A DIFFERENTIAL PROTECTION APPARATUS

This application is a continuation of application Ser. No. 792,709, filed Oct. 30, 1985, now abandoned.

BACKGROUND OF THE INVENTION

1. Field of the Invention

The present invention relates to a safety device for an electric installation protection apparatus capable of detecting a residual differential current; the safety device is of the type adapted for detecting a break in the neutral without discontinuity of supply and for this it is connected to a phase conductor and to a neutral conductor belonging to an AC distribution network.

The invention is applicable to differential protection apparatus protecting against direct or indirect contacts, such apparatus being adapted to obtain cut off and/or signalling. The invention is preferably applied to networks whose neutral, distributed and separated from the protection conductor, is grounded.

2. Description of the Prior Art

To increase the safety in use of a differential protection apparatus, it is known to associate with such as apparatus a supply device with rectifier circuit having a terminal for connection with the phase conductor, a terminal for connection with the neutral conductor and a terminal connected to ground through a second rectifier circuit; this circuit therefore allows the differential current detector to be supplied with power in the case of a break in the neutral provided there is redundance of the rectifier circuit.

Such a device has a main disadvantages the need to duplicate the rectifier circuit and, for detecting the absence or disappearance of the neutral, requires a specific means such as a special winding on the differential current detection core, or else a resistor disposed in the wire connecting the ground connection to the second rectifier circuit and a voltage/current converter means devoted solely to this detection function, or else a special signalling device.

The aim of the present invention is more especially to overcome such drawbacks by providing a safety device for a differential protection apparatus which allows the differential current detector to be used for detecting in a simple way the absence of a neutral while continuing to supply the rectifier bridge with power without requiring the addition of other detector or rectifier elements.

It also aims at providing positive reliability of operation of the protection device in the case of a fault current and/or break in the neutral.

SUMMARY OF THE INVENTION

The invention relates to a safety device for an electric installation protection apparatus, the protection apparatus comprising a residual differential current detector through which pass a phase conductor and a neutral conductor, and an electronic circuit for processing the differential current signal delivered by the detector, this circuit being normally supplied by a rectifier bridge connected to the phase and neutral conductors, the safety device having means for the emergency power supply of the processing circuit connected to a ground connection.

In accordance with the invention, the emergency power supply means are formed by a static bidirectional switch connected between the ground connection and the two AC terminals of the rectifier bridge, these terminals being connected to the parts of the phase and neutral conductors situated immediately downstream of the differential current detector of the protection apparatus. It can thus be seen that detection of a break in the neutral is provided by means of the differential current detector without requiring any additional detector means and that closure of the static switch results directly from a voltage rise between the ground connection and the phase and/or neutral conductor without requiring any additional rectifier means.

The static bidirectional switch may be formed by a triac connected between the ground connection and the two AC terminals of the rectifier bridge, the gate of the triac being connected through a resistor to the part of the neutral conductor situated between the corresponding AC terminal of the rectifier bridge and the differential current detector, or by a pair of Zener diodes mounted in opposition or in antiparallel between the ground connection and the two AC terminals of the rectifier bridge so as to form an automatic switch, for establishing upstream of the rectifier bridge, as soon as a break in the neutral occurs, a phase-ground connection ensuring continuance of the power supply for the bridge.

An impedance, preferably capacitive or highly capacitive and of high value, is advantageously disposed in the connection between the phase conductor and a DC terminal of the rectifier bridge.

In a preferred embodiment, the static bidirectional switch is connected through two parallel impedances respectively to the parts of the phase and neutral conductors situated immediately downstream of the differential current detector.

It is advantageous to combine with the safety device described a means for manually testing the differential protection apparatus by providing a switch whose opening is controlled by the test means, said switch being disposed in the part of the neutral conductor situated downstream of the differential current detector.

The invention relates also to the differential protection apparatus which is provided with the differential current detector and the electronic processing circuit and with which the safety device is associated.

BRIEF DESCRIPTION OF THE DRAWINGS

Several embodiments of the invention will be described hereafter by way of non limitative examples with reference to the accompanying drawings, in which.

DESCRIPTION OF THE PREFERRED EMBODIMENTS

Figure 1:
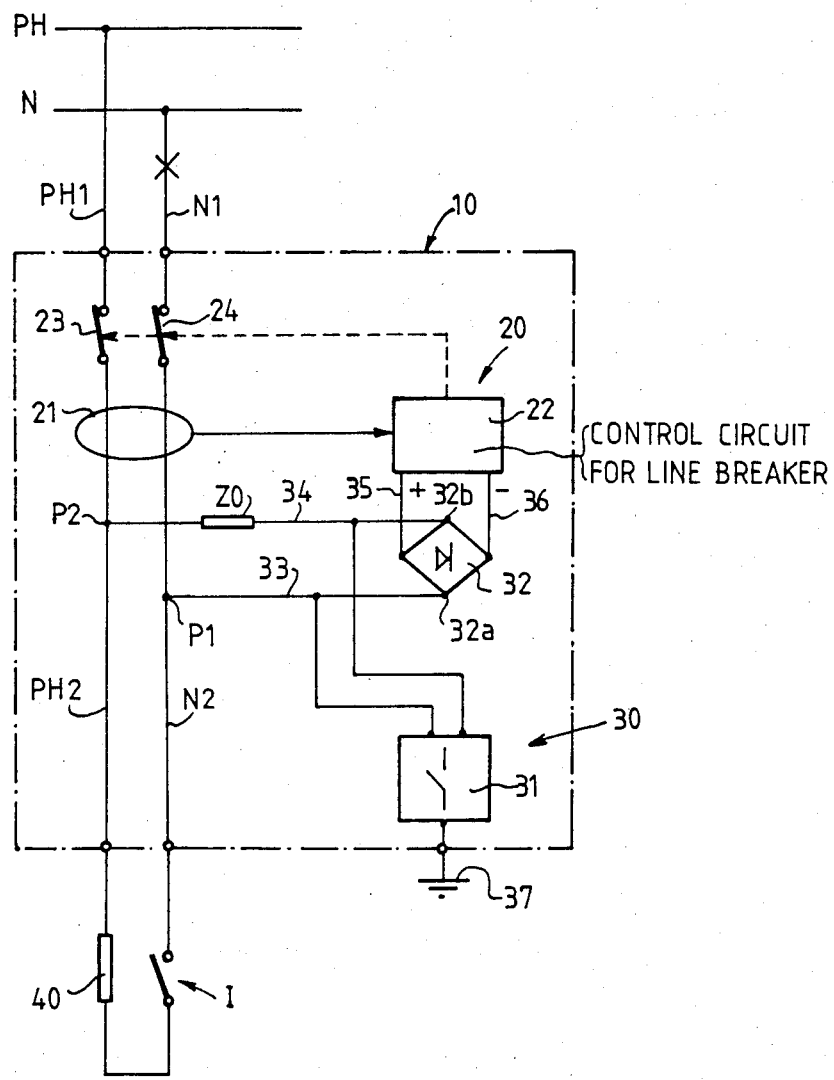
FIG. 1 is a diagram of a differential protection apparatus comprising the positive safety device of the invention.

The differential protection device 10 shown in FIG. 1 is connected to an AC distribution network, for example to the two phase PH and neutral N conductors of a low voltage mains. Apparatus 10 comprises a switch or circuit breaker assembly 20 and a positive safety device 30 in accordance with the invention.

The circuit breaker assembly 20 has a detector 21, an electronic processing circuit 22 and two contacts 23, 24; detector 21 is conventional and detects, for example by means of a core provided with windings, the residual differential current likely to appear between phase and neutral; the processing circuit 22 amplified and processes the differential current signal produced by the detector 21 so as to act through an electromechanical tripping means, not shown, on the contacts 23, 24 so as to open them. Contacts 23, 24 are disposed in the tappings PH1, N1 of the conductors PH and N supplying a load 40 which is disconnectable by means of a switch I.

The positive safety device 30 comprises a static bidirectional switch 31 associated with a rectifier bridge 32; normally, device 30 is biased from the conductors PH and N via two conductors, one neutral 33 and the other phase 34 connected at P1, P2 to the wires N and PH. The conductors 33, 34 are further connected to the AC current terminals of the rectifier bridge, whereas the DC terminals of the bridge are connected via wires 35, 36 to the processing circuit 22 of the circuit breaker assembly 20. A highly capacitive impedance Z0 is provided in conductor 34.

Switch 31 is connected between a ground connection 37 and the part PH2 of the phase conductor or N2 of the neutral conductor situated downstream of the detector 21 of the circuit breaker assembly 20. Such a connection is preferably provided by connecting the switch to conductors 33, 34 so that the switch is connected directly to the two AC voltage terminals 32a, 32b of the rectifier bridge.

The device of FIG. 1 operates in the following way: should a break occur in the neutral upstream of the protection apparatus, as shown by a cross in FIG. 1 and depending on the voltage rise then observed and detected between conductor 33 or 34 and the ground conductor 37, switch 31 is enabled and establishes the ground 37 and conductors PH34-neutral 33 connection.

This causes the appearance of a fault current picked up by detector 21 and processed by the electronic circuit 22 which controls the opening of contacts 23, 24.

Simultaneously, through the connection which it establishes between terminals 32a, 32b of the rectifier bridge and the ground conductor, the switch allows the bridge and so the electronic processing circuit 22 to be continued to be supplied with power.

Figure 2:
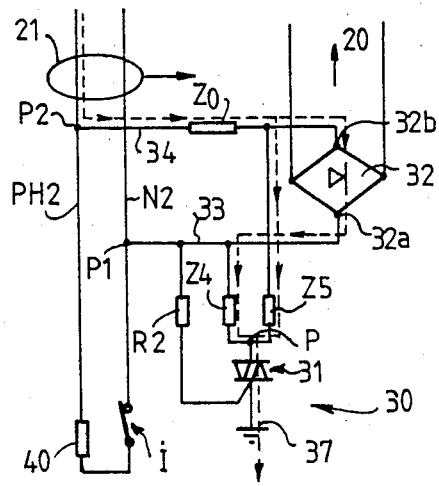
FIGS. 2 and 3 show one embodiment of the safety device with static switch comprising respectively a triac and two Zener diodes.

In the embodiment shown in FIG. 2, the static switch 31 is a triac one of whose terminals is connected to ground 37 and the other terminal of which is connected to a common point P itself connected, on the one hand, to neutral 33 through an impedance Z4 and, on the other hand, to the phase 34 through an impedance Z5. The gate of the triac is connected to wire 33 through a resistor R2 for adjusting the triggering current of the triac.

Figure 3:
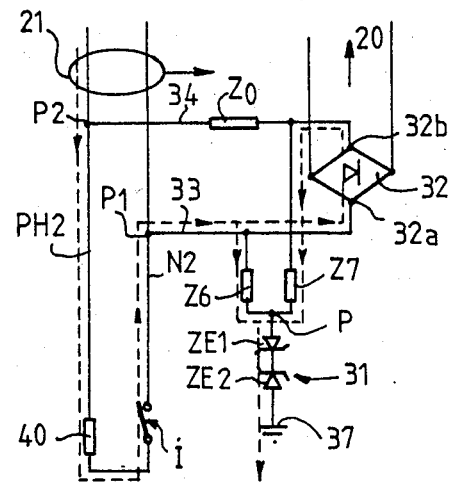

In FIG. 3, the static bidirectional switch 31, formed by a pair of Zener diodes ZE1, ZE2 disposed with opposite or head to tail connection is connected, on the one hand, to ground 37 and, on the other, to a point P itself connected through an impedance Z6 to neutral 33 and through an impedance Z7 to the phase 34. The switch is closed after the Zener voltage of diodes ZE1, ZE2 has been reached, during a break in the neutral.

It can be seen that the safety device of FIGS. 2, 3 operates satisfactorily whether switch I is open or closed. In FIGS. 2 and 3 broken lines show the path of the current when the neutral is cut, respectively in the case of opening of switch I (FIG. 2) and closure of switch I (FIG. 3).

Figure 4:
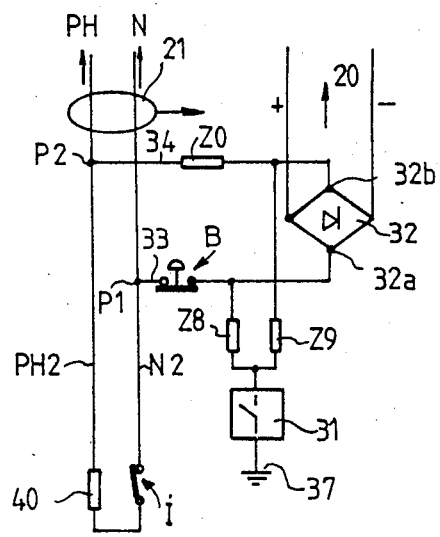
FIG. 4 shows the safety device provided with a manual test means.

With the bidirectional switch 31 illustrated in FIG. 4 there is associated a means for manually testing the protection apparatus 10. This test means comprises for example a push button of which only a break switch B has been shown disposed in conductor 33 or at any other position in the neutral conductor between the differential current detector 21 and the static switch 31.

To check the correct operation of the circuit breaker assembly 20, the user presses the test button, which opens switch B and thus simulates a break in the neutral 33 or N2 so as to trigger the circuit breaker assembly 20. Thus, the user is able to test at the same time the correct operation of the safety device 30 and the circuit breaker assembly 20.

In the embodiment shown in FIGS. 2, 3 and 4, the impedance Z4 and Z5, Z6 and Z7, Z8 and Z9 are chosen in interdependence with impedance Z0 for ensuring in all cases the power supply of the rectifier bridge and, on disappearance of the neutral, a ground current greater than the differential current threshold determining the sensitivity of the protection apparatus.

It goes without saying that modifications may be made to the embodiments described without departing from the scope of the invention. Thus, the static bidirectional switch may also be formed from transistors, thyristors, SBS, diacs or optical control switched. In addition, the safety device is applicable to a three phase network with distributed neutral for detecting the disappearance of two phases and neutral.

What is claimed is:

1. A ground fault current interrupter circuit used in an electric installation having phase and neutral conductors extending from a source of a-c energy to a load, said interrupter circuit comprising:

i. differential current detector means coupled to said phase and neutral conductors and generating a signal each time the difference between the currents flowing through the respective phase and neutral conductors exceeds a predetermined value;

ii. circuit opening means comprising processing circuit means connected to said detector means and switch means controlled from said processing circuit means and connected in the phase and neutral conductors upstream of said detector means, said processing circuit means being responsive to said signal to open the switch means;

iii. a rectifier bridge having d-c terminals connected to the process circuit means for power supplying the processing circuit means, said rectifier bridge further having first and second a-c terminals, impedance means connecting the first a-c terminal to the phase conductor downstream of the detector means and a lead connecting the second a-c terminal to the neutral conductor downstream of the detector means;

iv. static bidirectional switch means having first and second terminals, the first terminal being permanently grounded, and v. first and second resistor means, the first resistor means connecting the first a-c terminal to the second terminal of the static bidirectional switch means and the second resistor means connecting said lead to the second terminal of the static bidirectional switch means, whereby the switch means are switched on by the voltage which appears across said a-c terminals at each occurence of an opening of either one of the phase and neutral conductors upstream of the detector means and then conducting to the earth a current which exceeds said predetermined value.

2. A ground fault interrupter as claimed in claim 1, wherein said static bidirectional switch means comprise a pair of back-to-back Zener diodes.

3. A ground fault interrupter as claimed in claim 1, wherein said ground fault interrupter further comprises a test break switch inserted in said lead.

4. A ground fault current interrupter as claimed in claim 1, wherein said impedance means consist of a capacitance.

5. A ground fault current interrupter circuit used in in an electric installation having phase and neutral conductors extending from a source of a-c energy to a load, said interrupter circuit comprising:
  i. differential current detector means coupled to said phase and neutral conductors and generating a signal each time the difference between the currents flowing through the respective phase and neutral conductors exceeds a predetermined value;
  ii. circuit opening means comprising processing circuit means connected to said detector means and switch means controlled from said processing circuit means and connected in the phase and neutral conductors upstream of said detector means, said processing circuit means being responsive to said signal to open the switch means;
  iii. a rectifier bridge having d-c terminals connected to the processing circuit means for power supplying the processing circuit means, said rectifier bridge further having first and second a-c terminals, impedance means connecting the first a-c terminal to the phase conductor downstream of the detector means and a lead connecting the second a-c terminal to the neutral conductor downstream of the detector means;
  iv. static bidirectional switch means having first and second terminals, the first terminal being permanently grounded, and
  v. first and second resistor means, the first resistor means connecting the first a-c terminal to the second terminal of the static bidirectional switch means, and the second resistor means connecting said lead to the second terminal of the static bidirectional switch means, whereby the switch means are switching on by the voltage which appears across said a-c terminals at each occurence of an opening of either one of the phase and neutral conductors upstream of the detector means and then conducting to the earth a current which exceeds said predetermined value;
  vi. said static bidirectional switch means comprising a triac having input and output terminals which constitute said first and second terminals and further having a gate and resistor means connecting said gate to said lead.

* * * * *